July 30, 1968  V. BIZZARRI  3,395,029
BINDING MEANS USEFUL IN THE MANUFACTURE OF SHAPED BODIES
Filed Dec. 7, 1964
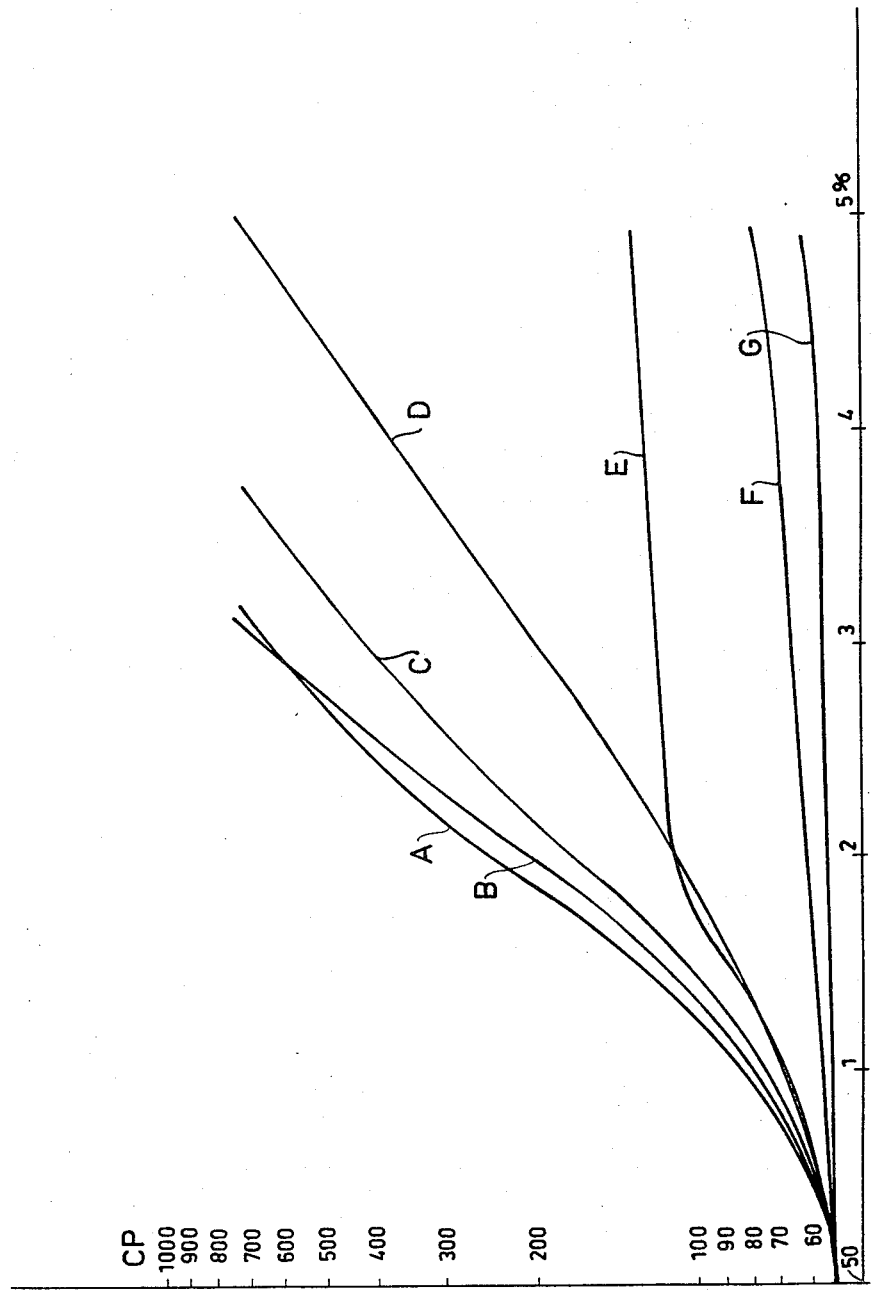
INVENTOR
VENANZIO BIZZARRI
BY Brumbaugh, Free, Graves & Donohue
ATTORNEY

3,395,029
BINDING MEANS USEFUL IN THE MANUFACTURE OF SHAPED BODIES

Venanzio Bizzarri, Kanthalgatan, Sweden, assignor to Aktiebolaget Kanthal, Hallstahammar, Sweden, a corporation of Sweden
Filed Dec. 7, 1964, Ser. No. 416,285
Claims priority, application Sweden, Dec. 9, 1963, 13,628/63
3 Claims. (Cl. 106—39)

ABSTRACT OF THE DISCLOSURE

The present specification discloses a method for improving the heat resistivity and plasticity of a binding material for heat resistant bodies such as molybdenum silicide. The binding material concerned is a clay mineral of the montmorillonite clay group and it is treated with an ionizable ammonium compound thereby to substitute ammonium ions for the metal ions in the clay mineral. Such treatment reduces the plasticity of the binding material and therefore in order to restore the plasticity it is preferred to add to the mixture a small amount of a monohydric alcohol containing from 1 to 4 carbon atoms.

---

The present invention has for its object to produce a binding means which is particularly suitable in the manufacture of shaped bodies in a powder metallurgical way or in a process common to the ceramic art which bodies are to be used at high temperatures. It has been previously proposed to produce such binding means of clay minerals such as of the montmorillonite group, particularly bentonite.

In the manufacture of electric resistance elements to be used at very high temperatures it is important that the binding means used in the manufacture does not produce substances in the final product which have a comparatively low melting point.

More particularly the binding means according to the invention is of interst in the manufacture of such resistance elements which contain a silicide component the metal of which is preferably molybdenum but may also consist of other transition metals in the 4th to 6th groups of the periodic system. In addition to said substances the element may include oxides, particularly silicon dioxide and aluminum oxide. The manner of manufacturing such resistance elements while using the minerals of the montmorillonite group is described at length, for instance, in the U.S. Patent 3,027,331 and in the British Patent 848,985.

The use of bentonite has been found to be of considerable importance. However, the minerals of the montmorillonite group and particularly bentonite include all metal ions the presence of which is accompanied by the disadvantage that the mineral melts at a rather moderate temperature. Such metal ions include earth alkali ions and alkali ions. This means that shaped bodies manufactured according to this known process cannot be used at temperatures higher than about 1700° C.

The present invention has for one of its objects to produce a binding means having a higher melting point, and with this object in view to relieve clay minerals, generally, such as montmorillonite mineral, particularly the bentonite, of the presence of metal ions thereby to raise substantially the melting point of the binding means.

Generally, such clay mineral should have a base exchange capacity of at least 10 milligrams equivalents per 100 grams dry substance.

The invention consists, inter alia, in pretreating the binding means with aqueous solution of an ammonium salt which results in the compounds being substituted by corresponding ammonium compounds. As anions to be associated with ammonium cation may be mentioned chloride, bromide, iodide, fluoride sulfate, nitrate, acetate and carbonate.

The advantages of substituting the alkali by the ammonium ion in accordance with the present invention resides in that during the heating and melting of the ammonium-treated bentonite ammonia is given off, as distinguished from the original bentonite which in melting produces a glass having a low melting point. Such glass contains a considerable amount of alkali, which is undesirable.

It has been discovered, however, that the substitution of the ammonium for the metal ions causes the binding means to loose some of its original plasticity. This loss is believed to be the result of changes in the dielectric properties of the minute thin leaves constituting the mineral.

In accordance with the present invention, however, the original plasticity of the binding means is restored by treating the slurry obtained after the pretreatment and substitution of ions, with an organic solvent which is miscible with water and which upon being added in a suitable proportion penetrates between the thin leaves of the mineral and restores the plasticity of the material either entirely or substantially.

The invention will now be more closely described with reference to an example.

Example

A slurry is made of 1300 grams dry bentonite and about 5 liters of distilled water in which 250 grams ammonium chloride $NH_4Cl$ are dissolved. After 24 hours the excess solution is decanted whereupon a new solution of $NH_4Cl$ is added. After further 12 hours a new decanting is made and a considerably weaker ammonium chloride solution added, the concentration thereof being preferably only one half of the previous concentration. After the lapse of a further period of 36 hours a new washing with distilled water is made whereupon the bentonite is allowed to settle for 24 hours whereupon the supernatant liquid is decanted. Three more such washing procedures with water and decantations are then made.

After the last decanting steps the bentonite slurry does not show an plasticity and weighs about 5000 grams, of which 3700 grams are water and 1300 grams are dry bentonite which corresponds to 74% by weight water and 26% by weight bentonite.

Although the bentonite slurry is thus free from alkali compounds now substituted by ammonium compounds it cannot be used in shaping the pulverulent bodies to be sintered in a powder-metallurgical process due to its lack of sufficient plasticity.

To restore the plasticity of the bentonite the following steps are taken. In a container having said 5000 grams of the slurry, ethyl alcohol was gradually added according to the table below. In the first column the total amount of ethyl alcohol is indicated:

| Grams ethyl alcohol | Percent by weight of the slurry | Percent by weight of water | Percent by weight of dry bentonite | Viscosity of the mixture in centipoise at 25° C. |
|---|---|---|---|---|
| 22 | 0.45 | 0.6 | 1.7 | 60 |
| 133 | 2.65 | 3.6 | 10.2 | 165 |
| 200 | 4.00 | 5.4 | 15.3 | 380 |
| 266 | 5.35 | 7.2 | 20.4 | ca. 920 |
| 355 | 6.25 | 9.6 | 27.2 | 2,000 |
| 1,100 | 22.00 | 30.0 | 85.0 | (¹) |
| 3,900 | 78.00 | 105.0 | 300.0 | |
| 6,350 | 126.00 | 171.0 | 485.0 | |

¹ Increasing.

At the last mentioned large quantities of alcohol it has been noticed that alcohol separated itself somewhat from the plastic mass.

A consistency suitable for industrial application is obtained when the alcohol is added in a quantity of from about 5 to about 78% by weight of the entire weight of the slurry.

Instead of ethyl alcohol, isopropyl alcohol may be advantageously added in which case only a content of from 3 to 8% by weight of the slurry is required. Generally, monohydric alcohols containing one to four carbon atoms can be used.

To get a better survey of the influence on the consistency when adding different organic solvents reference is made to the accompanying drawing in which the viscosity in centipoise (cp.) has been plotted as a function of the content of solvent added in percent by weight. The curves indicate clearly how the viscosity or plasticity increases with an increased addition of solvent and that the function is different for different additions.

Curve A shows the conditions in adding normal propyl alcohol,
Curve B the conditions of isopropyl alcohol,
Curve C of secondary butyl alcohol,
Curve D of ethyl alcohol,
Curve E of normal butyl alcohol,
Curve F of tertiary butyl alcohol and
Curve G of glycol.

The best result is thus obtained in adding propyl alcohol whereas glycol scarcely brings about any improvement at all of the viscosity.

The bentonite thus pretreated and plasticized is then mixed with the other pulverulent components whereupon the mass is shaped and sintered in a manner known per se. The way of manufacturing and sintering a shaped body of finely divided molybdenum disilicide and a finely divided plastic clay of the montmorillonite group is described in detail in the Patent No. 3,027,331.

For example, 100 parts of molybdenum disilicide powder having grain sizes finer than 10 microns are mixed with bentonite (Wyoming) prepared according to the example above corresponding to 5 parts of silica, and water added to suitable workability. The plastic mixture is worked 48 hours under vacuum and extruded. The extruded rods, 7 and 14 mm. respectively, are dried and presintered under pure hydrogen up to 100° C. The rods are then pushed through a furnace under pure hydrogen at 1300–1400° C. and after that treatment they have strength enough to be handled. The porosity is now about 15 to 20% by volume and the composition corresponds to the raw materials used. The rods are now sintered a few minutes in air at 1600° C. by means of direct current heating.

It has been found that if the shaped bodies are obtained in a powder-metallurgical way from a starting mass substantially composed of molybdenum silicide and, if desired silicon carbide, while using binding means according to the present invention, such bodies may be used continuously at temperatures up to 1800° C.

What I claim is:

1. The method for improving the heat resistivity and plasticity of a binding material consisting essentially of minerals of the montmorillonite clay mineral group containing base exchangeable metal ions for the manufacture of shaped bodies, comprising preparing an aqueous slurry of said binding material and treating said slurry with an ionizable ammonium compound having a concentration high enough to substitute ammonium ions for said metal ions in said binding material, adding to an aqueous slurry of said binding material containing ammonium ions a monohydric alcohol containing from one to four carbon atoms and in quantity sufficient to improve substantially the plasticity of the slurry.

2. A binding material suitable for use in the manufacture of shaped bodies, said binding material consisting essentially of a clay mineral of the montmorillonite clay group previously treated with ammonium ions to remove essentially all of the base exchangeable metal ions originally present therein, and also containing a small amount of a monohydric alcohol containing one to four carbon atoms effective to improve the plasticity of the binding material.

3. The method for manufacturing heat resistant bodies consisting essentially of molybdenum silicide and a ceramic binder, selecting an aqueous slurry of a clay of the montmorillonite clay group having a base exchange capacity of at least 10 milligrams equivalents per 100 grams dry substance, exchanging substantially all base exchangeable metal ions in said clay by ammonium ions, imparting high plasticity to said clay by adding thereto a small amount of a monohydric alcohol in amount sufficient to produce a plastic mixture of clay and water, mixing pulverulent molybdenum silicide with said clay, the relative proportions of clay and molybdenum silicide being selected to produce a heat resistant body, shaping said mixture and sintering it into a non-porous body.

References Cited
UNITED STATES PATENTS
3,027,331  3/1962  Schrewelius _____ 252—518
3,201,197  8/1965  Showalter _____ 23—112

FOREIGN PATENTS
447,710  5/1936  Great Britain.

JAMES E. POER, *Primary Examiner.*

UNITED STATES PATENT OFFICE
CERTIFICATE OF CORRECTION

Patent No. 3,395,029                                  July 30, 1968

Venanzio Bizzarri

It is certified that error appears in the above identified patent and that said Letters Patent are hereby corrected as shown below:

Column 2, line 44, "an" should read -- any --. Column 3, line 44, "100° C." should read -- 1000° C. --.

Signed and sealed this 30th day of December 1969.

(SEAL)
Attest:

Edward M. Fletcher, Jr.                      WILLIAM E. SCHUYLER, JR.
Attesting Officer                                Commissioner of Patents